United States Patent [19]

Garrido

[11] Patent Number: 5,451,053
[45] Date of Patent: Sep. 19, 1995

[54] RECONFIGURABLE VIDEO GAME CONTROLLER

[76] Inventor: Fernando P. Garrido, 4101 Fariss La., El Sobrante, Calif. 94803-2211

[21] Appl. No.: 303,817

[22] Filed: Sep. 9, 1994

[51] Int. Cl.⁶ ............................................. A63F 9/22
[52] U.S. Cl. .................... 273/148 B; 273/435
[58] Field of Search ............... 273/433, 434, 435, 438, 273/148 B

[56] References Cited

U.S. PATENT DOCUMENTS 5,112,051 5/1992 Darling et al. ................ 273/434 X

*Primary Examiner*—Raleigh W. Chiu

[57] ABSTRACT

A reconfigurable video game controller comprising a housing; a primary connector socket having a first group of contacts and a second group of contacts; a plurality of actuateable action switches disposed on the housing with each action switch having a terminal portion coupled to a contact pin of the first group and transmitting an action signal when actuated; an actuateable joystick having a terminal portion coupled to at least one contact pin of the first group and transmitting a directional signal when actuated; controller terminal means formed of a plurality of leads each having a first end coupled to a contact of the second group and a second end extended from the housing; and supplemental action switch customizing cartridge means securable within the primary connector socket for modifying and directing existing action signals and directional signals transmitted between the first group of contacts and second group of contacts for use by a video game and generating and transmitting additional action signals for use by a video game.

5 Claims, 5 Drawing Sheets

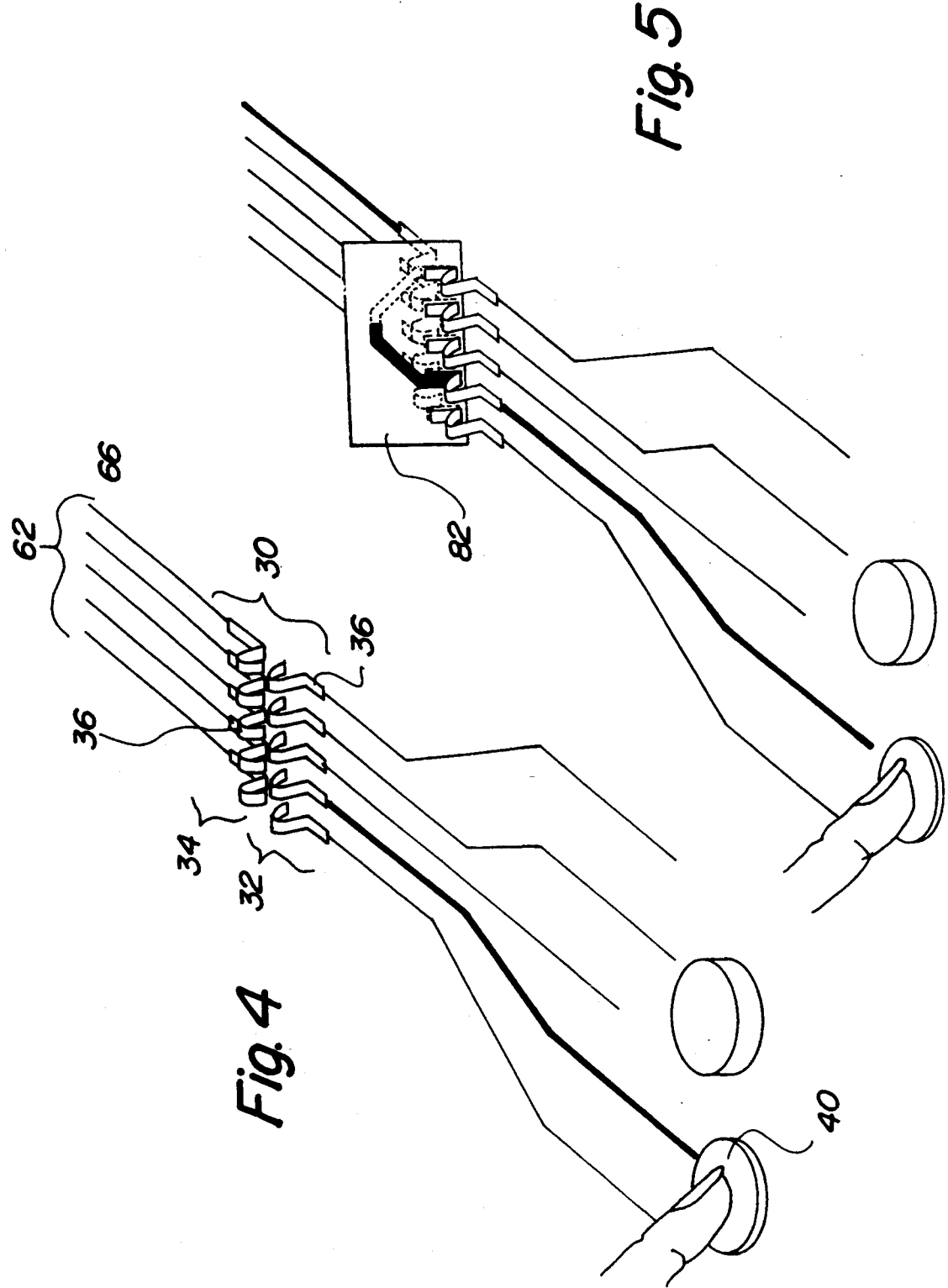

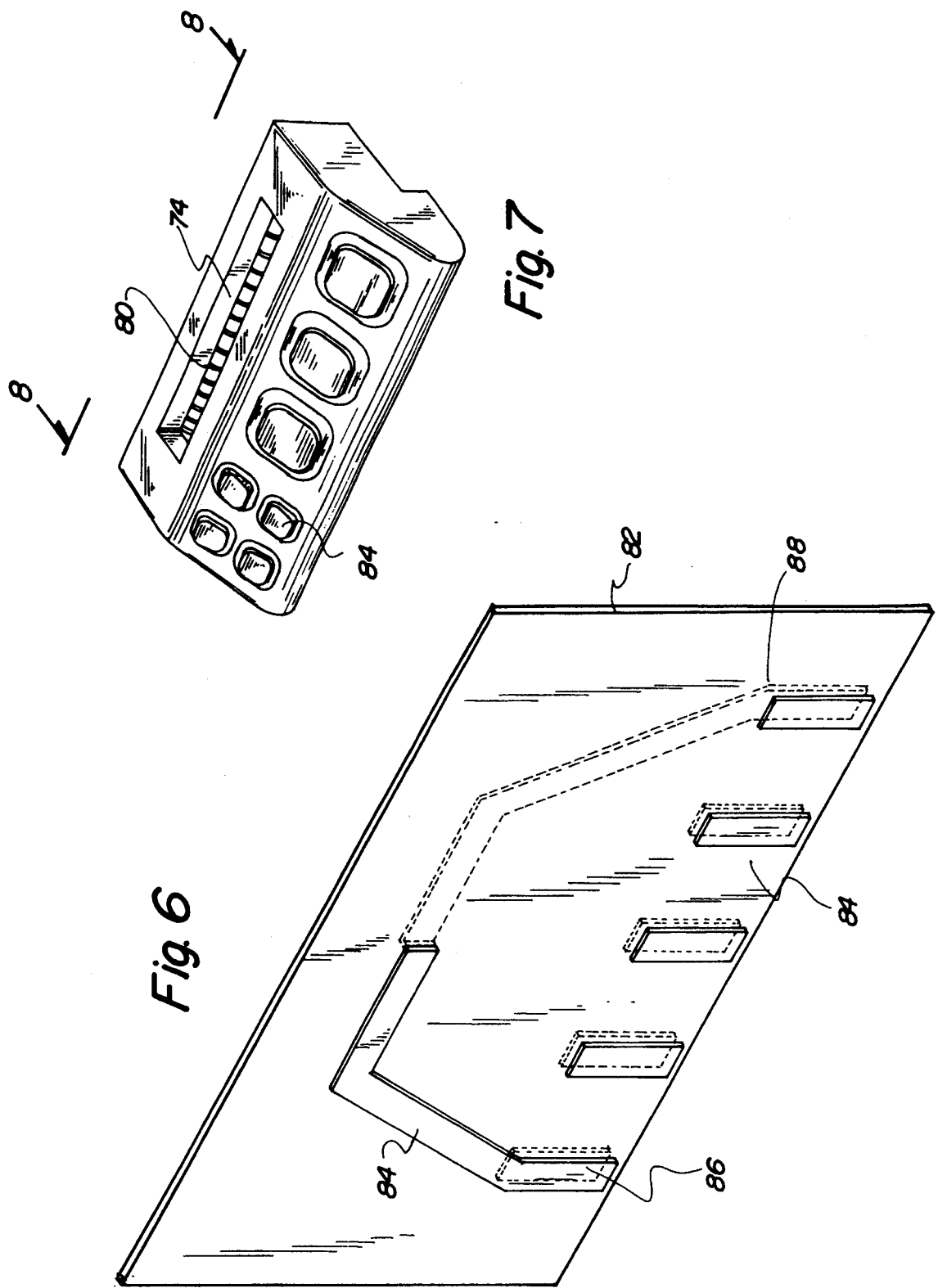

RECONFIGURABLE VIDEO GAME CONTROLLER

BACKGROUND OF THE INVENTION

1. Field of the Invention

The present invention relates to a reconfigurable video game controller and more particularly pertains to allowing the control of operation of video games with a reconfigurable video game controller.

2. Description of the Prior Art

The use of video game controllers is known in the prior art. More specifically, video game controllers heretofore devised and utilized for the purpose of controlling operation of video games are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,439,648 to Reiner et al. discloses a joystick-type controller. U.S. Pat. No. 4,849,583 to Meyer discloses an electrical joy stick control device. U.S. Pat. No. 4,926,172 to Gorsek discloses a joystick controller. U.S. Pat. No. 5,207,426 to Inoue et al. discloses a controller for a game machine. U.S. Pat. No. 5,259,626 to Ho discloses a programmable video game controller.

While these devices fulfill their respective, particular objective and requirements, the aforementioned patents do not describe a reconfigurable video game controller that supports a variety of different types of video games and may be reconfigured to mimic the increased functionality of arcade video games.

In this respect, the reconfigurable video game controller according to the present invention substantially departs from the conventional concepts and designs of the prior art, and in doing so provides an apparatus primarily developed for the purpose of allowing the control of operation of a video game.

Therefore, it can be appreciated that there exists a continuing need for new and improved reconfigurable video game controller which can be used for allowing the control of operation of a video game. In this regard, the present invention substantially fulfills this need.

SUMMARY OF THE INVENTION

In the view of the foregoing disadvantages inherent in the known types of video game controllers now present in the prior art, the present invention provides an improved reconfigurable video game controller. As such, the general purpose of the present invention, which will be described subsequently in greater detail, is to provide a new and improved reconfigurable video game controller and method which has all the advantages of the prior art and none of the disadvantages.

To attain this, the present invention essentially comprises, in combination, a generally rectangular flat plastic housing with rounded corners having a top face, a bottom face including a rubber pad secured thereto, and a periphery interconnecting the top face with the bottom face, a pair of oblong recesses formed on the top face with the oblong recesses positioned near the periphery and defining handles for allowing a user a firm grip during play, and a rectangular recess formed on the top face between the oblong recesses. A primary connector socket is included and disposed on the housing near the periphery thereof with the primary connector socket having a first prong and a second prong each formed of electrically conductive contact pins. A plurality of depressible action switches are included and disposed within the rectangular recess of the housing with each action switch having an electrically conductive terminal portion coupled to a contact pin of the first prong of the primary connector socket and with each action switch having a depressed position adapted for transmitting a unique action signal and a released position for preventing such transmission. A joystick is included and disposed within the rectangular recess of the housing. The joystick has a handle portion and a terminal portion with the terminal portion coupled to at least one contact pin of the first prong of the primary connector socket and with the handle portion positionable in a plurality of directions for transmitting unique directional signals and further having a released position for preventing such transmission. A controller cable is included and has a terminal end disposed within the housing and a plug end coupleable to a video game and with the controller cable further formed of a plurality of electrically conductive elongated leads with each lead having a first end coupled to a contact pin of the second prong of the primary socket connector and a second end extended from the housing and terminated at the plug end. Supplemental action switch customizing cartridge means are included and securable within the primary connector socket for modifying and directing existing action signals and directional signals for use by a video game in a first mode and generating additional unique action signals for use by a video game in a second mode. Lastly, a plurality of rectangular overlays are separately disposable within the rectangular aperture of the housing and about the action switches and joystick with each overlay bearing indicia thereupon indicative of functionality provided to the action switches and joystick based upon a particular video game played.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved reconfigurable video game controller which has all the advantages of the prior art video game controllers and none of the disadvantages.

It is another object of the present invention to provide a new and improved reconfigurable video game controller which may be easily and efficiently manufactured and marketed.

It is a further object of the present invention to provide a new and improved reconfigurable video game controller which is of durable and reliable construction.

An even further object of the present invention is to provide a new and improved reconfigurable video game controller which is susceptible of a low cost of manufacture with regard to both materials and labor, and which accordingly is then susceptible of low prices of sale to the consuming public, thereby making such a reconfigurable video game controller economically available to the buying public.

Still yet another object of the present invention is to provide a new and improved reconfigurable video game controller which provides in the apparatuses and methods of the prior art some of the advantages thereof, while simultaneously overcoming some of the disadvantages normally associated therewith.

Even still another object of the present invention is to provide a new and improved reconfigurable video game controller for allowing the control of operation of a video game.

Lastly, it is an object of the present invention to provide a new and improved reconfigurable video game controller comprising a housing; a primary connector socket disposed on the housing having a first group of electrically conductive contacts and a second group of electrically conductive contacts; a plurality of actuateable action switches disposed on the housing with each action switch having an electrically conductive terminal portion coupled to a contact pin of the first group and with each action switch transmitting an action signal when actuated; an actuateable joystick having an electrically conductive terminal portion coupled to at least one contact pin of the first group and with the joystick transmitting a directional signal when actuated; controller terminal means formed of a plurality of electrically conductive elongated leads with each lead having a first end coupled to a contact of the second group and a second end extended from the housing for coupling with a video game; and supplemental action switch customizing cartridge means securable within the primary connector socket for modifying and directing existing action signals and directional signals transmitted between the first group of contacts and second group of contacts for use by a video game in a first mode and generating and transmitting additional action signals for use by a video game in a second mode.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic depiction of the association of an depressible action switch with the controller cable through use of a connector socket. In this configuration, the action signal is prevented from being transmitted through the controller cable to the video game.

FIG. 5 is a schematic depiction of the association of an depressible action switch with the controller cable through the connector socket. In this depiction, a first circuit modifier board is disposed within the connector socket for providing connectivity between a depressible action switch and one lead of the controller cable. In this fashion, the first circuit modifier board may be configured to direct signals from a depressible action switch to the appropriate lead on the controller cable. Thus, functionality of the action switches may be modified.

FIG. 6 is a perspective view of the first circuit modifier board for directing action signals from the action switches to the appropriate leads on the controller cable.

FIG. 7 is a perspective view of the supplemental action switch mechanism for providing additional action switches or modifying the operation of existing action switches on the housing. The supplemental action switch mechanism also includes a secondary connector socket adapted to receive a circuit modifier board for changing the configurability of the action switches thereon for controlling the operation of a video game.

The same reference numerals refer to the same parts through the various Figures.

DESCRIPTION OF THE PREFERRED EMBODIMENT

Figure 1:
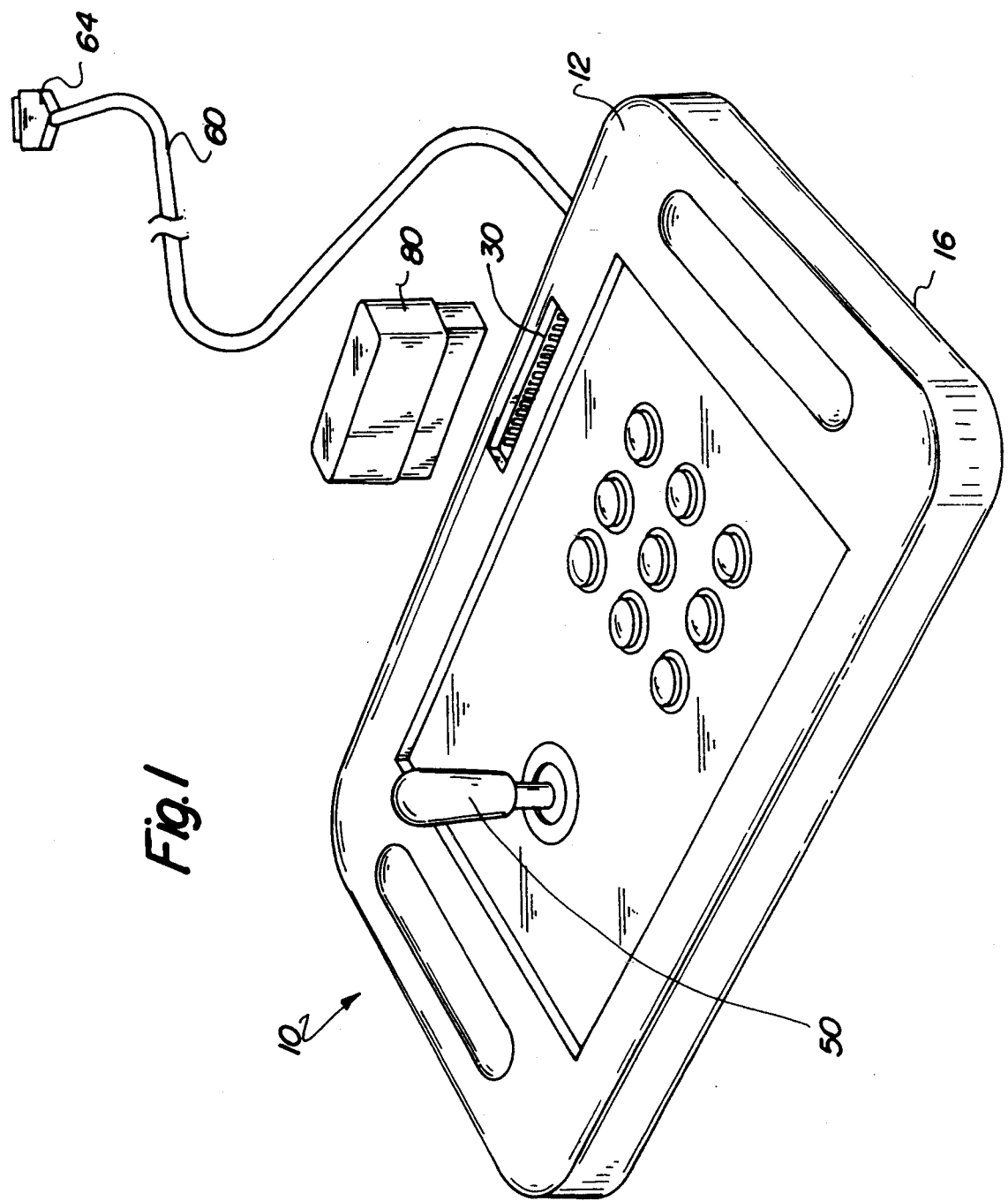
FIG. 1 is a perspective view of the preferred embodiment of the reconfigurable video game controller constructed in accordance with the principles of the present invention.
Figure 2:
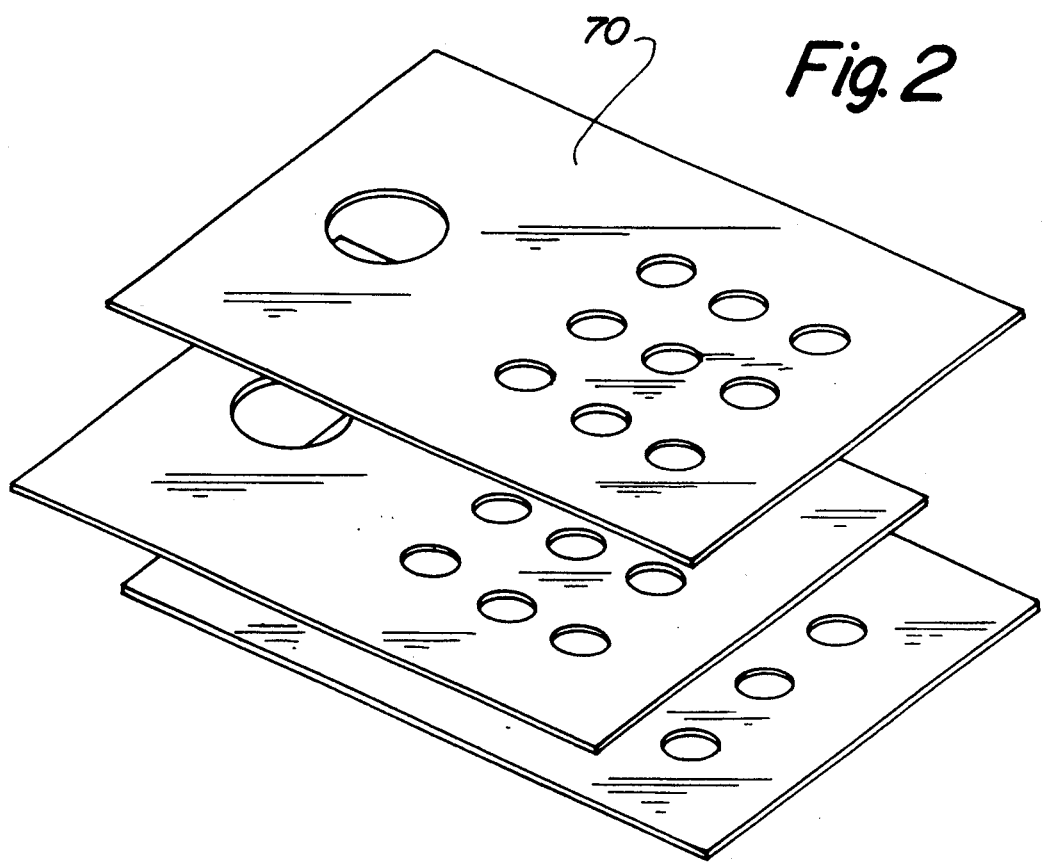
FIG. 2 is a perspective view of the plurality of custom overlays bearing indicia indicative of the functionality provided through play of a particular video game.
Figure 3:
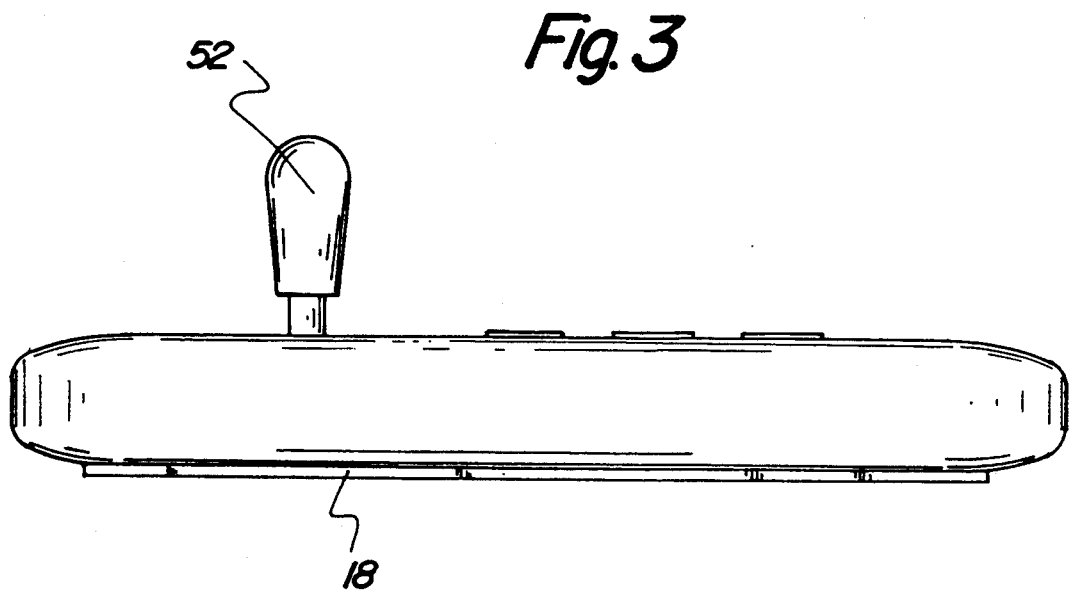
FIG. 3 is a side-elevational view of the present invention.
Figure 8:
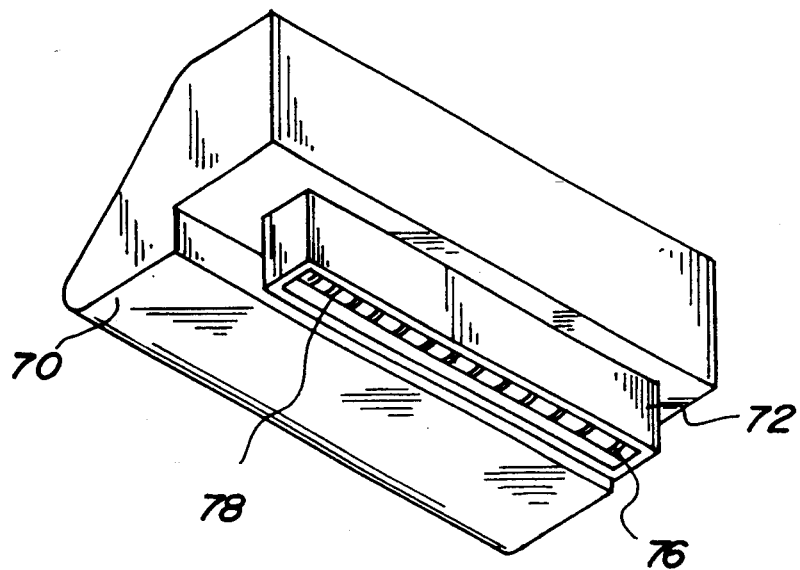
FIG. 8 is a bottom perspective view of the supplemental action switch mechanism taken along the line 8—8 of FIG. 7. In this orientation, the lower end of the secondary socket is securable within the primary connector socket of the housing.

With reference now to the drawings, and in particular, to FIG. 1 thereof, the preferred embodiment of the new and improved reconfigurable video game controller embodying the principles and concepts of the present invention and generally designated by the reference number 10 will be described.

Specifically, the present invention includes seven major components. The major components are the housing, primary connector socket, action switches, joystick, controller cable, overlays, and supplemental action switch customizing cartridge means. These components are interrelated to provide the intended function of allowing a video game controller to be reconfigured for use with a variety of video games.

More specifically, it will be noted in the various Figures that the first major component is the housing 12. The housing is generally rectangular and flat in structure. It is formed of a rigid plastic material. The housing has rounded corners and includes a top face 14, a bottom face 16, and a periphery 20 interconnecting the top face with the bottom face. The bottom face includes a rubber pad 21 secured thereto for preventing the housing from slipping when placed on a recipient supporting surface. The housing includes a pair of oblong recesses 22 formed on the top face. Each oblong recess is positioned near the periphery of the housing. Each recess defines a handle for allowing a user a firm grip during play of a video game. The housing includes a rectangular recess 24 formed on the top face between the oblong recesses. The rectangular recess is adapted for receiving an overlay specific to a particular video game to be played therein.

The second major component is the primary connector socket 30. The primary connector socket is disposed on the housing near the periphery thereof. The primary connector socket has a first prong 32 and a second prong 34. Each prong is formed of electrically conductive contact pins 36.

The third major component is the action switches 40. The present invention includes a plurality of depressible action switches. The action switches are disposed within the rectangular recess 24 of the housing in a matrix-like fashion. In the preferred embodiment, nine action switches are used. Each action switch has an electrically conductive terminal portion coupled to a contact pin 36 of the first prong 32 of the primary connector socket. Each action switch has a depressed orientation adapted for transmitting a unique action signal and a released position for preventing such transmission. The unique action signals are used for controlling a video game.

The fourth major component is the joystick 50. The joystick is disposed within the rectangular recess 24 of the housing. The joystick has a handle portion 52 for allowing a user a firm grip. The joystick also has a terminal portion coupled to at least one contact pin of the first prong 32 of the primary connector socket. When the handle of the joystick is directed in a particular direction, a unique directional signals is transmitted for indicating a particular direction in a video game. The joystick also has a central position that prevents transmission of unique directional signals. The joystick attains the central position when it is released or pressure is removed therefrom.

The fifth major component is the controller cable 60. The controller cable has a terminal end 62 disposed within the housing and a plug end 64 extended therefrom. The plug end is coupleable to a video game residing on a computer, television, or the like. The controller cable is further formed of a plurality of electrically conductive elongated leads 66 encased in a sheath. Each lead has a first end coupled to a contact pin 36 of the second prong 34 of the primary socket connector. Each lead also has a second end extended from the housing and terminated at the plug end for coupling with a video game.

The sixth major component is the overlays 70. The present invention includes a plurality of overlays. Each overlay is rectangular and generally rigid in structure. Each overlay is disposable within the rectangular aperture of the housing and about the action switches and joystick. Each overlay bears indicia thereupon indicative of functionality provided to the action switches and joystick based upon a particular video game played. For example, action buttons may be designated as firing buttons, speed control buttons or event buttons.

The seventh major component is the supplemental action switch customizing cartridge means 80. The action switch customizing cartridge means is securable within the primary connector socket. The action switch customizing cartridge means is used for modifying and directing existing action signals and directional signals for use by a video game in a first mode. The action switch customizing cartridge means is also used for generating additional unique action signals for use by a video game in a second mode. The action switch customizing cartridge means includes circuitry therein for performing such modification and direction. Each customizing cartridge means would be tailored for a particular video game.

In the preferred embodiment, the action switch customizing cartridge means is operable only in the first mode. It includes a first circuit modifier board 82. The circuit modifier board is removably securable within the primary connector socket 30. The first circuit modifier board is held in or is integral with a pluggable cartridge-type housing to prevent it from being damaged. The first circuit modifier board has an insulated substrate with a first surface and a second surface. It also includes a plurality of electrically conductive leads 84 disposed thereon. Each lead has an end 86 extended from the first surface and coupleable with a contact pin 36 of the first prong 32 of the primary connector socket. Each lead also has a second end 88 extended from the second surface and coupleable with a second contact pin 36 of the second prong 34 of the primary connector socket. This coupling thereby creates a plurality of circuit paths for transmission of action signals and directional signals through the controller cable 60 for use by a video game as shown in FIG. 5.

Figure 9:
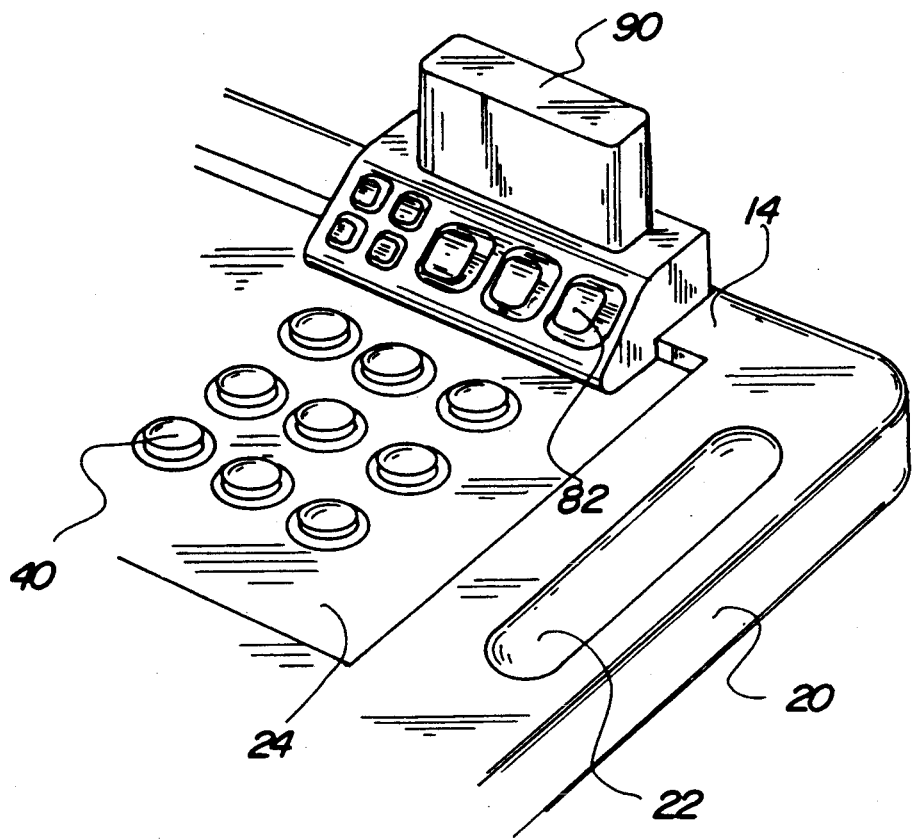
FIG. 9 is a perspective view of the supplemental action switch customizing cartridge means formed of a supplemental action switch mechanism with a circuit modifier board secured therein for modifying the operation selected action switches on the housing and providing additional action switches for use in controlling the operation of a video game.

A second embodiment of the present invention is shown in FIG. 9 and includes substantially all of the components of the present invention further including a customizing cartridge means that is both operable in the first mode and the second mode. The customizing cartridge means is formed of a supplemental action switch mechanism with a second circuit modifier board housed in cartridge 90. The supplemental action switch mechanism is used for generating additional action signals for use by a video game to complement those currently generated. The supplemental action switch mechanism may also be used to modify or override action signals generated. The supplemental action switch mechanism comprises a rigid container 70. The supplemental action switch mechanism also includes a secondary connector socket 72 extended through the container to define an upper end 74 and a lower end 76. The secondary socket connector has an electrically conductive first prong 78 and an electrically conductive second prong 81. Each prong is formed of a plurality of contact pins 36. The first prong of the secondary connector socket at the lower end 76 is coupleable with the first prong 34 of the primary connector socket 30. Also, the second prong of the secondary socket at the lower end 76 is coupleable with the second prong 34 of the primary connector socket. The supplemental action switch mechanism includes a plurality of depressible supplemental action switches 92. Each supplemental action switch has an electrically conductive terminal portion coupled to a contact pin of the first prong 78 of the secondary connector socket 72. Each supplemental action switch has a depressed position adapted for transmitting a unique action signal and a released position for preventing such transmission. The supplemental action switch mechanism also includes a plurality of switchable supplemental action switches 94. Each switchable supplemental action switch has an electrically conductive terminal portion coupled to a contact pin of the first prong 78 of the secondary connector socket 72. Each switchable supplemental action switch has one position for transmitting a unique action signal and another position for preventing such transmission.

Also included in the second embodiment is the second circuit modifier board 90. The second circuit modifier board is removably securable within the secondary connector socket at the upper end 74 thereof. The second circuit modifier board is held in or is integral with a pluggable cartridge-type housing to prevent it from being damaged. The second circuit modifier board is similar to the first circuit modifier board in that it has an insulated substrate with a first surface and a second surface and a plurality of electrically conductive leads formed thereon with each lead having an end extended from the first surface and coupleable with a contact pin of the first prong 78 of the secondary connector socket 72 and a second end extended from the second surface and coupleable with a second contact pin of the second prong 80. Coupling of the second circuit modifier board in the secondary connector socket of the supplemental action switch mechanism with thereby creates a plurality of circuit paths for transmission of existing action signals, modified action signals, additional action signals, and directional signals for use by a video game.

The present invention is an enhanced video game controller for home video games. The present invention provides the ability to alter the functions and abilities of the controller for each video game utilized. The present invention is unique in the way that it resembles the arcade game playing experience by means of nine depressible action switches, one joystick, and one primary customizing connector socket. The nine depressible action switches enable the user to more closely mimic the actions and techniques used when playing arcade games. The primary customizing connector socket is also a new feature which allows the switches and joystick to be custom matched to the video game being controlling. The difference in the action switch operation for each game is clearly distinguished by overlays which are custom matched with indicia for each particular video game. The housing measures approximately 14.5 inches by 9.3 inches by 1.9 inches and the joystick adds about 2.6 inches to the overall height. The size of the present invention makes it very comfortable for holding on a user's lap or on a table. The plastic overlays are brightly colored to match the game being played. Standard techniques are employed to operate the action switches and joystick. When a user changes a game in a game deck of a home video game, the overlay and supplemental action switch customizing cartridge means are also changed.

The present invention employs several unique features. First, it employs a variety of different overlays. Each overlay has its own unique graphic and color scheme. Different overlays are used to compliment a wide variety of video games. The overlays also support the reconfigurability of the joystick and action switches. The overlays thus serve as visual aids in helping a user identify the different joystick positions and action switches and their associated functions for each particular video game.

The second feature of the present invention that is useful is its employment of a connector socket that provides a circuit connection between all of the action switches and joystick movements on the housing. The connector cable that plugs into the video game unit is also associated with the connector socket. The present invention employs a first circuit modifier board that allows the reconfiguration of the action switches relative to the leads of the controller cable. Once the first circuit modifier board is plugged within the connector socket, the action switch and joystick configurations are modified based on the remapping scheme of the first circuit modifier board. This remapping is shown in FIG. 5. FIG. 4 is a simplified illustration of what happens when a depressible action switch is depressed. Without the first circuit modifier board attached to the connector socket, the circuit path stays open and no signal is sent to a video game unit via the cord. FIG. 5 is similar to FIG. 4 except that a first circuit modifier board is attached. Depressing a depressible action switch now transmits a signal to the fifth wire of the controller cable.

The use of the connector socket allows not just the attachment of the first circuit modifier board but also allows the attachment of a supplemental action switch mechanism. The supplemental action switch mechanism allows selected depressible action switches on the housing to be overridden or provides additional depressible and switchable action switches for use. Furthermore, the supplemental action switch mechanism provides a plurality of switches for controlling various modes of a video game. Thus, the supplemental action switch mechanism provides increased flexibility, expandabilty, and interoperability amongst a variety of video games. Thus, a user may now configure a video game to operate similarly to those found in video arcades.

The present invention includes add-on enhancements that contain a combination of depressible and switchable action switches with the necessary electronic circuitry to provide enhanced features found in advanced controllers. The present invention may even deploy memory chips whereby a user can record a sequence of moves and play them back with control of the action switches. Thus, the present invention attempts to re-create the aura that surrounds an arcade game while providing arcade-level control for home systems. The design of the joystick and action switches mimic the controls of an arcade game. Video game players should no longer feel constrained when going from the arcade version to the home version of a particular video game. Thus, through use of the first circuit modifier board and supplemental action switch mechanism, the present invention may be re-configured to mimic the arcade version of a given video game.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A reconfigurable video game controller comprising, in combination:
    a generally rectangular flat plastic housing with rounded corners having a top face, a bottom face including a rubber pad secured thereto, and a periphery interconnecting the top face with the bottom face, a pair of oblong recesses formed on the top face with each oblong recess positioned near the periphery and with each defining a handle for allowing a user a firm grip during play, and a rectangular recess formed on the top face between the oblong recesses;
    a primary connector socket disposed on the housing near the periphery thereof with the primary connector socket having a first prong and a second prong each formed of electrically conductive contact pins;
    a plurality of depressible action switches disposed within the rectangular recess of the housing with each action switch having an electrically conductive terminal portion coupled to a contact pin of the first prong of the primary connector socket and with each action switch having a depressed position adapted for transmitting a unique action signal and a released position for preventing such transmission;
    a joystick disposed within the rectangular recess of the housing and having a handle portion and a terminal portion with the terminal portion coupled to at least one contact pin of the first prong of the primary connector socket and with the handle portion positionable in a plurality of directions for transmitting unique directional signals and further having a released position for preventing such transmission;
    a controller cable having a terminal end disposed within the housing and a plug end coupleable to a video game, the controller cable further formed of a plurality of electrically conductive elongated leads with each lead having a first end coupled to a contact pin of the second prong of the primary socket connector and a second end extended from the housing and terminated at the plug end;
    supplemental action switch customizing cartridge means securable within the primary connector socket for directing existing action signals and directional signals for use by a video game in a first mode and generating additional unique action signals for use by a video game in a second mode; and
    a plurality of rectangular overlays each disposable within the rectangular aperture of the housing and about the action switches and joystick, each overlay bearing indicia thereupon indicative of functionality provided to the action switches and joystick based upon a particular video game played.

2. A reconfigurable video game controller comprising, in combination:
    a housing;
    a primary connector socket disposed on the housing having a first group of electrically conductive contacts and a second group of electrically conductive contacts;
    a plurality of actuateable action switches disposed on the housing with each action switch having an electrically conductive terminal portion coupled to a contact pin of the first group and with each action switch transmitting an action signal when actuated;
    an actuateable joystick having an electrically conductive terminal portion coupled to at least one contact pin of the first group and with the joystick transmitting at least one unique directional signal when actuated;
    controller terminating means formed of a plurality of electrically conductive elongated leads with each lead having a first end coupled to a contact of the second group and a second end extended from the housing for coupling with a video game; and
    supplemental action switch customizing cartridge means securable within the primary connector socket for modifying and directing existing action signals and directional signals transmitted between the first group of contacts and second group of contacts for use by a video game in a first mode and generating and transmitting additional action signals for use by a video game in a second mode.

3. The reconfigurable video game controller as set forth in claim 2 further including a plurality of overlays each disposable upon the housing and bearing indicia thereupon indicative of functionality provided to the action switches and the joystick based upon a particular video game played.

4. The reconfigurable video game controller as set forth in claim 2 wherein the supplemental action switch customizing cartridge means is operable in the first mode only and comprises a first circuit modifier board removably securable within the primary connector socket and having an insulated substrate with a first surface and a second surface and a plurality of electrically conductive leads with each lead having an end extended from the first surface and coupleable with a contact of the first group of the primary connector socket and a second end extended from the second surface and coupleable with a second contact of the second group of the primary connector socket thereby creating a plurality of circuit paths for transmission of action signals and directional signals through the controller terminating means for use by a video game.

5. The reconfigurable video game controller as set forth in claim 2 wherein the supplemental action switch customizing cartridge means is operable in both the first mode and the second mode and comprises:

a supplemental action switch mechanism for generating additional action signals for use by a video game further comprising a rigid container, a secondary connector socket extended through the container to define an upper end and a lower end with the secondary socket connector having an electrically conductive first group of electrically conductive contacts and a second group of electrically conductive contacts and with the first group of the secondary connector socket at the lower end thereof coupleable with the first group of the primary connector socket and the second group of the secondary socket at the lower end thereof coupleable with the second group of the primary connector socket, a plurality of depressible supplemental action switches each having an electrically conductive terminal portion coupled to a contact of the first group of the secondary socket and with each depressible supplemental action switch having a depressed position adapted for transmitting a unique action signal and a released position for preventing such transmission, a plurality of switchable supplemental action switches each having an electrically conductive terminal portion coupled to a contact of the first group of the secondary socket and with each switchable supplemental action switch having one position adapted for transmitting a unique action signal and another position for preventing such transmission; and a second circuit modifier board removably securable within the secondary connector socket at the upper end thereof and having an insulated substrate with a first surface and a second surface and a plurality of electrically conductive leads with each lead having an end extended from the first surface and coupleable with a contact of the first group of the secondary connector socket and a second end extended from the second surface and coupleable with a contact of the second group of the secondary connector socket thereby creating a plurality of circuit paths for transmission of action signals and directional signals through the controller cable for use by a video game.

* * * * *